United States Patent
Himmelmann et al.

(10) Patent No.: US 12,551,829 B2
(45) Date of Patent: Feb. 17, 2026

(54) FLUID SEPARATION AND CONDENSATE CONTROL SYSTEMS

(71) Applicant: Hamilton Sundstrand Space Systems International, Inc., Windsor Locks, CT (US)

(72) Inventors: Ashley Himmelmann, Hartford, CT (US); Allison Bender, Hampden, MA (US); Tyler Thomas Stebbins, Suffield, CT (US); Christopher H. Miller, West Springfield, MA (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 360 days.

(21) Appl. No.: 18/191,566

(22) Filed: Mar. 28, 2023

(65) Prior Publication Data

US 2024/0325970 A1    Oct. 3, 2024

(51) Int. Cl.
*B01D 45/08* (2006.01)
*B01D 53/26* (2006.01)
(Continued)

(52) U.S. Cl.
CPC .......... *B01D 45/08* (2013.01); *B01D 53/265* (2013.01); *B01D 53/268* (2013.01); *B64G 1/46* (2013.01);
(Continued)

(58) Field of Classification Search
None
See application file for complete search history.

(56) References Cited

U.S. PATENT DOCUMENTS

| 4,984,625 A | 1/1991 | Lichtfuss |
| 6,391,100 B1 * | 5/2002 | Hogan ................... B01D 47/10 261/DIG. 54 |

(Continued)

FOREIGN PATENT DOCUMENTS

| CN | 104034625 A | 9/2014 | |
| WO | WO-2017153136 A1 * | 9/2017 | ............. B01D 45/08 |
| WO | 2019229749 A1 | 12/2019 | |

OTHER PUBLICATIONS

WO2017153136A1_Eng (Espacenet machine translation of Coelho) (Year: 2017).*

(Continued)

*Primary Examiner* — Gabriel E Gitman
(74) *Attorney, Agent, or Firm* — CANTOR COLBURN LLP (57) ABSTRACT

Phase separator systems may include a condenser configured to receive humid air, the condenser configured to convert the humid air into a two-phase fluid having a gaseous portion and a liquid portion. A transition duct is arranged downstream from the condenser and configured to direct the two-phase fluid through a narrowing path defined by the transition duct. A separator is arranged downstream from the transition duct and configured to interact with the two-phase fluid that exits the transition duct and capture the liquid portion and permit the gaseous portion to bypass the separator and flow downstream therefrom as a reduced moisture content airflow. A condensate dispersion element is arranged between the condenser and the separator and includes a dispersion structure arranged to break up liquid droplets of the liquid portion of the two-phase fluid and direct said liquid droplets to the separator.

20 Claims, 9 Drawing Sheets

(51) Int. Cl.
  *B64G 1/46* (2006.01)
  *B01D 46/00* (2022.01)
  *B01D 53/00* (2006.01)

(52) U.S. Cl.
  CPC .......... *B01D 46/003* (2013.01); *B01D 53/002* (2013.01); *B01D 2257/80* (2013.01); *B01D 2259/4575* (2013.01)

(56) References Cited

U.S. PATENT DOCUMENTS

| | | | | |
|---|---|---|---|---|
| 7,811,343 | B2* | 10/2010 | Toma | B01D 45/08 55/423 |
| 8,202,339 | B2* | 6/2012 | Janakiraman | B01D 45/08 55/463 |
| 10,612,824 | B2 | 4/2020 | Cho | |
| 2018/0230873 | A1* | 8/2018 | Herman | F01M 13/04 |
| 2018/0264387 | A1* | 9/2018 | Wagner | B01D 51/00 |
| 2019/0105590 | A1 | 4/2019 | Friestad et al. | |
| 2021/0154608 | A1* | 5/2021 | Yao | B01D 53/002 |
| 2021/0394910 | A1 | 12/2021 | Ciais et al. | |
| 2022/0144458 | A1* | 5/2022 | Guyette | C02F 9/00 |
| 2023/0219025 | A1* | 7/2023 | Strange | B64G 1/48 55/307 |

OTHER PUBLICATIONS

European Search Report for Application No. 24167751.7, mailed Sep. 17, 2024, 8 pages.

\* cited by examiner

FLUID SEPARATION AND CONDENSATE CONTROL SYSTEMS

BACKGROUND

Embodiments disclosed herein pertain to the art of flow separation and, in particular, to attachments for fluid separation systems.

Environmental control systems are used on aircraft, in buildings, and even space craft. Humidity control is part of many systems (e.g., home and auto air conditioning, submarine and space vehicle environment control and life support (ECLS) systems). Dehumidification includes liquid condensation, generally with a heat exchanger, liquid separation, and liquid recovery. Efficient liquid separation and recovery may be particularly important in space applications where resource replenishment is limited and systems may be subject to low gravity or microgravity. Phase separation, for temperature and humidity control for human space habitation, in low and microgravity conditions is a challenging technical problem. Controlling parameters that impact water droplet behavior (e.g., surface tension, droplet size, etc.) are critical to effective phase control. Ensuring desired water droplet behavior may provide improved benefits and features for environmental control systems.

BRIEF DESCRIPTION

According to some embodiments, phase separator systems are provided. The phase separator systems include a condenser configured to receive humid air from a source space, the condenser configured to convert the humid air into a two-phase fluid having a gaseous portion and a liquid portion, a transition duct arranged downstream from the condenser in a flow direction through the phase separator system and configured to direct the two-phase fluid through a narrowing path defined by the transition duct, a separator arranged downstream from the transition duct, the separator configured to interact with the two-phase fluid that exits the transition duct and capture the liquid portion and permit the gaseous portion to bypass the separator and flow downstream therefrom as a reduced moisture content airflow, and a condensate dispersion element arranged between the condenser and the separator, the condensate dispersion element comprising a dispersion structure arranged to break up liquid droplets of the liquid portion of the two-phase fluid and direct said liquid droplets to the separator.

In addition to one or more of the features described herein, or as an alternative, further embodiments of the phase separator system may include that the condensate dispersion element comprises a frame and the dispersion structure comprises a mesh material.

In addition to one or more of the features described herein, or as an alternative, further embodiments of the phase separator system may include that the mesh material has a mesh size of between 40×40 mesh count per inch and 400×400 mesh count per inch.

In addition to one or more of the features described herein, or as an alternative, further embodiments of the phase separator system may include that the mesh material has a mesh size of 150×150 mesh count per inch.

In addition to one or more of the features described herein, or as an alternative, further embodiments of the phase separator system may include that the condensate dispersion element is attached to an outlet end of the condenser.

In addition to one or more of the features described herein, or as an alternative, further embodiments of the phase separator system may include that the condensate dispersion element is attached to an upstream end of the transition duct.

In addition to one or more of the features described herein, or as an alternative, further embodiments of the phase separator system may include that the condensate dispersion element is attached to a downstream end of the transition duct.

In addition to one or more of the features described herein, or as an alternative, further embodiments of the phase separator system may include that the condensate dispersion element is arranged within the transition duct between an inlet end and an outlet end thereof.

In addition to one or more of the features described herein, or as an alternative, further embodiments of the phase separator system may include that the condensate dispersion element occupies at least 20% of a cross-sectional area of the transition duct.

In addition to one or more of the features described herein, or as an alternative, further embodiments of the phase separator system may include that the condensate dispersion element is a first condensate dispersion element arranged within the transition duct, the system further comprising a second condensate dispersion element arranged downstream from the first condensate dispersion element within the transition duct.

In addition to one or more of the features described herein, or as an alternative, further embodiments of the phase separator system may include that the second condensate dispersion element comprises openings that are smaller than openings of the first condensate dispersion element.

In addition to one or more of the features described herein, or as an alternative, further embodiments of the phase separator system may include that the condensate dispersion element comprises a hydrophilic surface coating.

In addition to one or more of the features described herein, or as an alternative, further embodiments of the phase separator system may include that the condensate dispersion element is made of stainless steel, a stainless steel alloy, an aluminum alloy, a nickel alloy, a titanium alloy, a polymer, or a combination thereof.

In addition to one or more of the features described herein, or as an alternative, further embodiments of the phase separator system may include a condensate director arranged between the condenser and the separator, the condensate director configured to receive liquid droplets and direct said liquid droplets along the length of collector elements to the separator.

In addition to one or more of the features described herein, or as an alternative, further embodiments of the phase separator system may include that the condensate dispersion element is arranged upstream in a flow direction from the condensate director.

In addition to one or more of the features described herein, or as an alternative, further embodiments of the phase separator system may include a blower arranged to provide motive force to the humid air to pass through the condenser, the transition duct, and the separator.

In addition to one or more of the features described herein, or as an alternative, further embodiments of the phase separator system may include that the source space is a human occupancy cabin.

In addition to one or more of the features described herein, or as an alternative, further embodiments of the phase separator system may include that the cabin is a cabin of a spacecraft.

In addition to one or more of the features described herein, or as an alternative, further embodiments of the phase separator system may include that the cabin, the condenser, the transition duct, and the separator define a closed-loop system that is configured to remove liquid content of the two-phase fluid before returning reduced moisture content air back to the cabin.

In addition to one or more of the features described herein, or as an alternative, further embodiments of the phase separator system may include a thermal control valve and a bypass configured to direct a portion of the humid air around the condenser, the transition duct, and the separator to be mixed with the reduced moisture content air prior to returning to the cabin.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of embodiments of the disclosed systems are presented herein by way of exemplification and not limitation with reference to the Figures.

Environmental control, and particularly humidity control, may be an important process in many environments, such as for ensuring proper conditions for human habitation or occupancy. The processes involved in humidity control may be especially important to revitalize water and breathable air in a space environment (e.g., in orbit, in low gravity, in microgravity, etc.). Embodiments of the systems described herein relate to attachment mechanisms and devices for separators that assist in separation of liquids and gases. For example, embodiments of the present disclosure may be incorporated into various separator configurations, including and without limitation, passive inline annular phases separators, elbow configurations, active separator systems (e.g., rotary, etc.), and the like. As such, the specific type and configuration of the separator and/or system into which embodiments of the present disclosure may be incorporate is not limited to the specific illustrative embodiments shown and described herein, but may be implemented in any liquid-gas separator system and/or configuration, as will be appreciated by those of skill in the art.

In some non-limiting embodiments, the phase separators of the present disclosure may be arranged in line with a condenser, for example, such that a two-phase (e.g., air and water) flow that is output by the condenser is separated for recovery and reuse of each of the phases. For example, the two-phase flow may be separated into annular flow with a gas (e.g., air) flowing around an outside of a condensate liquid recovery loop that is configured to extract or capture a liquid (e.g., water) present in a fluid flow through the system. The arrangement of the phase separator may facilitate a passive (i.e., unpowered) configuration for water/gas separation. In some embodiments, a fan or blower may be arranged along a flow path of a two-phase flow to drive or power the two-phase flow through the condenser and/or separator. It will be appreciated that embodiments of the present disclosure may provide benefits in both low/zero-gravity environments as well as in gravity environments. That is, embodiments of the present disclosure may be employed in normal gravity (e.g., Earth's gravity field) and may provide improvements over conventional separators. For example, ground testing of hardware for low or zero gravity applications/operations may benefit from embodiments described herein. Furthermore, embodiments of the present disclosure may be used in other ground or surface or Earth-based uses and applications. As such, the present disclosure is not intended to be limited to low or zero gravity applications, but rather these features are described as example applications and examples of benefits that may be realized through implementation of embodiments described herein.

Figure 1:
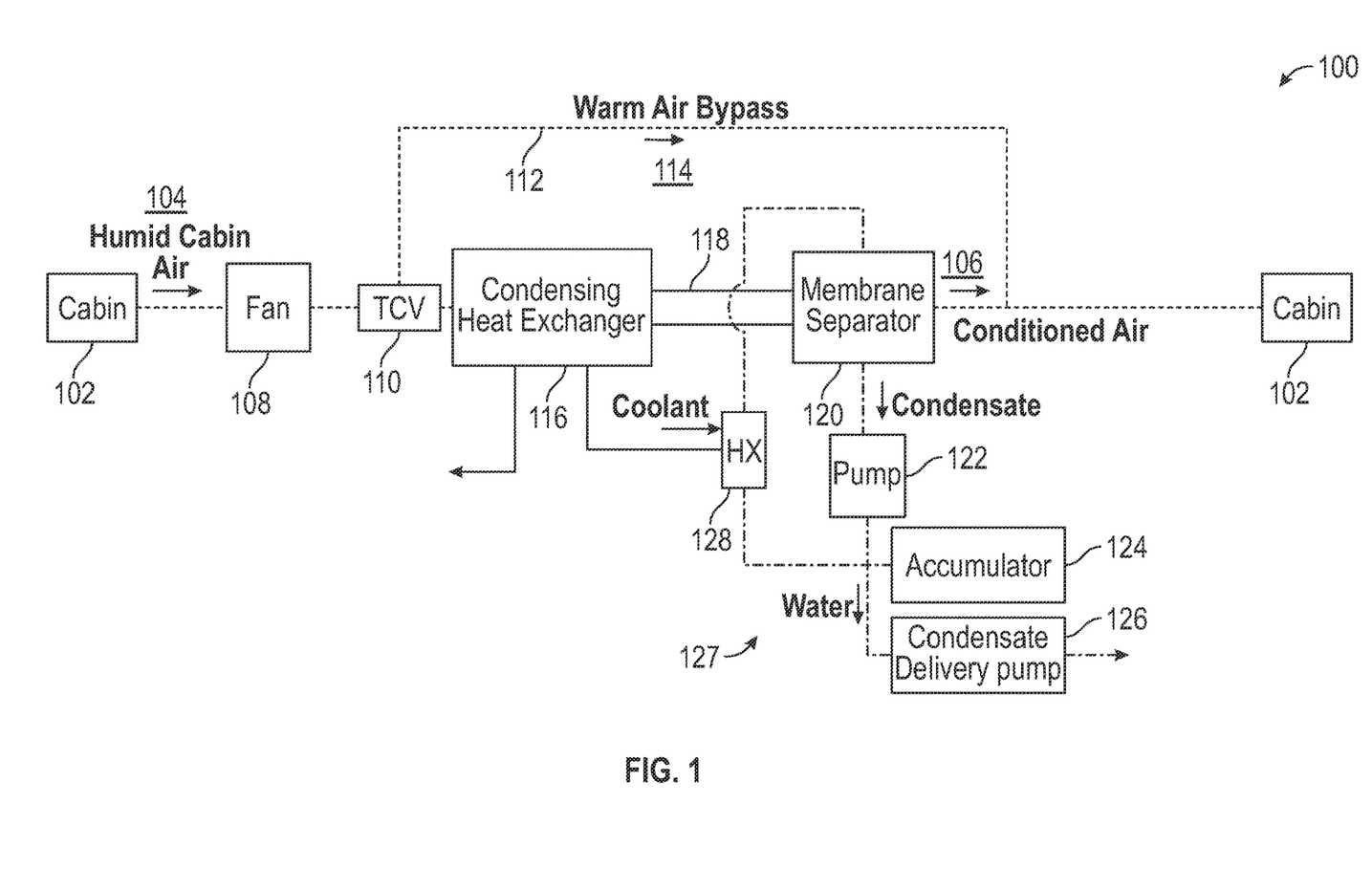
FIG. 1 is a schematic diagram of an environmental control system that may incorporate embodiments of the present disclosure.

Referring to FIG. 1, a schematic diagram of an environmental control system 100 that may incorporate embodiments of the present disclosure is shown. The environmental control system 100 may be an environmental control system of a spacecraft intended to be occupied by humans in space. The environmental control system 100 includes a cabin 102 that may have one or more human occupants therein. Moist or humid air 104 may be sourced from the cabin 102 and treated within the environmental control system 100, with at least a portion of the treated air being recycled back into the cabin 102 (e.g., conditioned air 106). The environmental control system 100 is configured to remove moisture from the air to be treated, and recover said water for various purposes. The cabin 102 may be a habitat, cabin of a spacecraft, an airlock, or other volume that is configured to house humans in a low or microgravity environment.

In this illustrative configuration, a fan 108 is arranged to pull the humid air 104 from the cabin 102. A temperature control valve 110 is arranged downstream from the fan 108 and configured to control a bypass flow path 112 that is configured to bypass downstream components of the environmental control system 100. Such a bypass flow 112 may be used to divert a portion of warm bypass air 114 to mix with the conditioned air 106 prior to recycling into the cabin 102.

Downstream from the temperature control valve 110 is a condensing heat exchanger 116. The condensing heat exchanger 116 is configured to cool air from the cabin 102 to reduce the dew point and cause water within the air to condense and form into droplets or the like. The condensing heat exchanger 116 may receive the cabin air 104 as a primary fluid and a coolant or the like as a secondary fluid, with the coolant having a lower temperature than the primary fluid. In some examples, and without limitation, the secondary fluid may be chilled water, propylene glycol water (PGW), or other type of coolant. In accordance with some non-limiting embodiments, the secondary fluid may be maintained below 50° F., or around 40° F., although cooler temperatures may be employed without departing from the scope of the present disclosure.

The cooled cabin air 104 (e.g., mixture of gas and liquid droplets) may be directed along a conduit 118 from the condensing heat exchanger 116 to a separator 120 (e.g., membrane separator, centrifugal separator, filter vane separator, etc.) for separation and directing of the separate gas phase and liquid phase. From the separator 120, the conditioned air 106 may be directed back into the cabin 102. As noted, the conditioned air 106 may include a mixture with a portion of the humid air 104, which has not been cooled, and thus the conditioned air 106 may be mixed with a portion of humid air 104 in order to increase the temperature of the conditioned air 106 before being reintroduced into the cabin 102.

The fluid phase (e.g., water) that is separated from the flow at the membrane separator 120 may be condensed and collected (e.g., collected liquid water). The collected liquid (e.g., water) may be pumped by a pump 122 and directed into an accumulator 124 (e.g., storage container) and/or a liquid delivery system (e.g., condensate delivery pump 126), for use of the liquid water. The liquid water may be used for drinking, human use, directed to fuel cells, dumped overboard, used for cooling purposes, or otherwise used onboard a craft or other structure that includes the cabin 102. As shown, a condensate collection loop 127 may be configured to recirculate condensate and includes a heat exchanger 128 arranged upstream of the membrane separator 120 along the condensate collection loop 127. A portion of the flow within the condensate collection loop 127 may be stored in the accumulator 124 which may be periodically emptied by the pump 122 (e.g., condensate delivery pump).

If the environmental control system 100 is employed in a low gravity or microgravity environment, it may be difficult to ensure that the liquid water is separated from the gas phase. As such, additional features or functions may be required in such a system. Specifically, because the environmental control system 100 cannot rely upon gravity causing relatively heavy water droplets from "falling" and separating from an airflow, and because arranging the system directionally becomes difficult (e.g., in microgravity, there is low to no directionality), a mechanism to assist removal of the liquid water from the flow through the environmental control system 100 may be required. In accordance with some embodiments of the present disclosure, the condensing heat exchanger 116, the conduit 118, and the separator 120 may be configured as a single or combined structure.

Figure 2A:
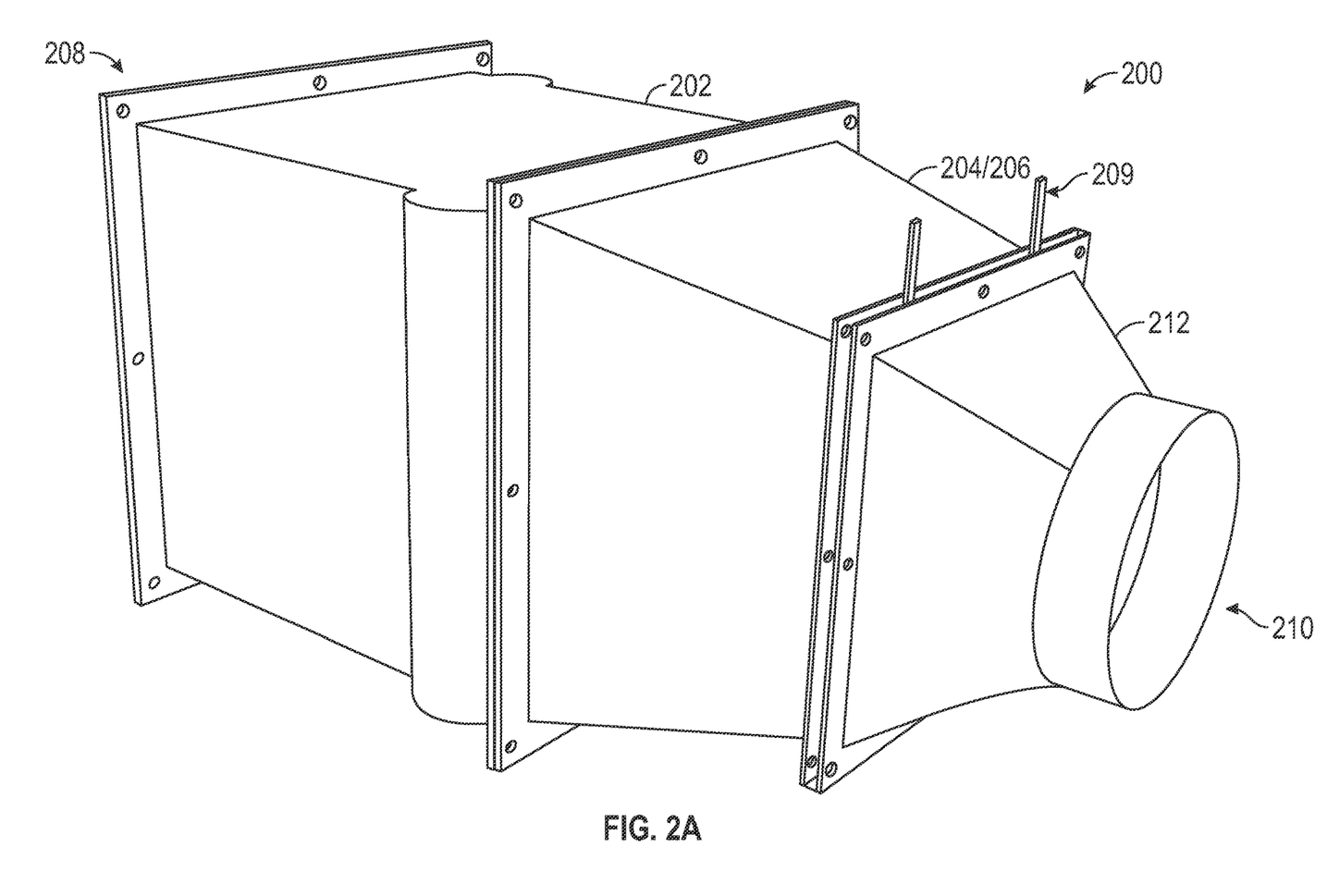
FIG. 2A is a schematic illustration of a phase separator system that may incorporate embodiments of the present disclosure.
Figure 2B:
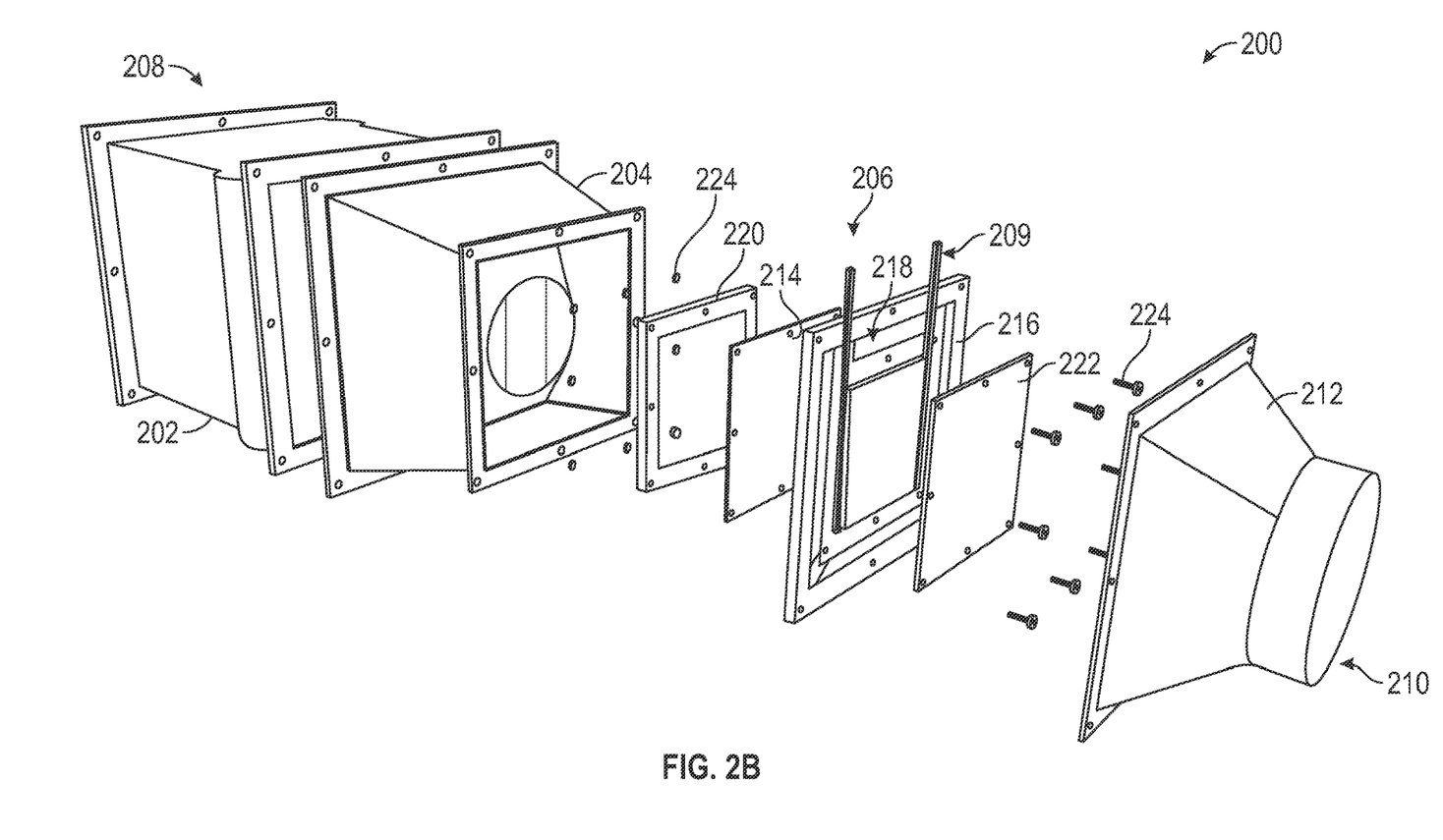
FIG. 2B is an exploded view of the phase separator system of FIG. 2A.

For example, referring now to FIGS. 2A-2B, schematic illustration of a phase separator system 200 that may incorporate embodiments of the present disclosure are shown. The phase separator system 200 includes a condenser 202, a transition duct 204, and a separator 206, with the phase separator system 200 extending in a flow direction from an inlet 208 to an outlet 210. The inlet 208 is configured to receive humid air (e.g., humid air 104) and treat or process the humid air to separate liquid water from the humid air. The humid air may be sourced from a cabin aboard a spacecraft or other structure that may be present in a low gravity or microgravity environment. Liquid water may be separated from the airflow at the separator 206 and a reduced humidity gas (e.g., conditioned air 106) may be passed from the outlet 210 and directed back into the cabin.

The condenser 202 may be equivalent to the condensing heat exchanger 116 shown in FIG. 1, and is attached at an upstream end of the phase separator system 200. A fan, not shown, may be arranged upstream from the condenser 202 to directed forced air into and through the phase separator system 200. The condenser 202 may be configured to cool a temperature of the humid air that passes therethrough, in preparation of separating liquid water from gas. The cooled air is then directed into the transition duct 204 and directed to interact with the components of the separator 206. The separator 206 may include a liquid recovery loop 209, for capturing, storing, reusing, or otherwise directing the liquid portion out of the phase separator system 200. An outlet conduit 212 may be provided to direct a dried gas through the outlet 210 and back to the cabin.

FIG. 2B is an exploded view of the phase separator system 200. In this illustrative embodiment, the separator 206 includes a liquid permeable membrane 214 that is permeable to liquid (e.g., water or water-based liquid) and is configured to direct the liquid through to the liquid recovery loop 209 for collection, storage, use, etc. The liquid permeable membrane 214 and the liquid recovery loop 209 are sized and arranged on opposite sides within a central portion of a membrane frame 216 such that one or more openings 218 on an outside portion of the membrane frame 216 are not obstructed. The liquid permeable membrane 214 is configured to prevent or does not allow flow of a gas and, instead, diverts the gas flow to the openings 218 of the membrane frame 216. Thus, the membrane frame 216 and the arrangement of the liquid permeable membrane 214 at the center of the membrane frame 216 are configured to facilitate division of a two-phase flow to annular flow with the gas flowing around the outside of the liquid permeable membrane 214, and then directed downstream toward the outlet 210.

At the inlet 208, the humid air enters the condenser 202 and is cooled. When the air is cooled, it becomes a two-phase fluid that enters the separator 206. That is, the two-phase fluid is directed to the separator 206 at an outlet or downstream end of the conduit condenser 202. As shown, a membrane retainer 220 is arranged to separate the liquid permeable membrane 214 from the conduit 206 and to provide protection and support for the liquid permeable membrane 214. A solid backplate 222 may be provided to separate the liquid recovery loop 209 from the outlet conduit 212. As shown, the backplate 222 may be affixed to the member retainer 220 (e.g., via one or more fasteners 224 (e.g., screws/bolts and nuts)) through the membrane frame 216 to hold together the liquid permeable membrane 214 and the liquid recovery loop 209 on either side of the membrane frame 216. The backplate 222 may be sized according to a size of the liquid permeable membrane 214 and the liquid recovery loop 209 such that gas may pass, via annular flow, through the openings 218 of the membrane frame 216 and is not obstructed by the backplate 222. As shown in FIG. 2B, the membrane retainer 220 and the backplate 222 are configured to sandwich the liquid permeable membrane 214, the membrane frame 230, and the liquid recovery loop 209 between the conduit 206 and the outlet conduit 212.

FIGS. 2A-2B illustrate the structure and geometry of components of the phase separator system 200 as having generally square shapes. However, the components of the phase separator system 200 may have other geometric shapes and/or relative sizes. For example, and without limitation, the geometry shape of the components may be circular, oval, rectangular, or any other shape. It will be appreciated that the liquid permeable membrane 214, regardless of its shape, may be sized and matched with the size (and optionally the shape) of the membrane frame 216 to facilitate the openings 218 for the annular flow of gas around the outside of the liquid permeable membrane 214. The size, number, and arrangement of the openings 218 may be selected based on an expected flow rate of gas in order to minimize a pressure drop or for volumetric, flow rate, or other considerations.

Figure 3:
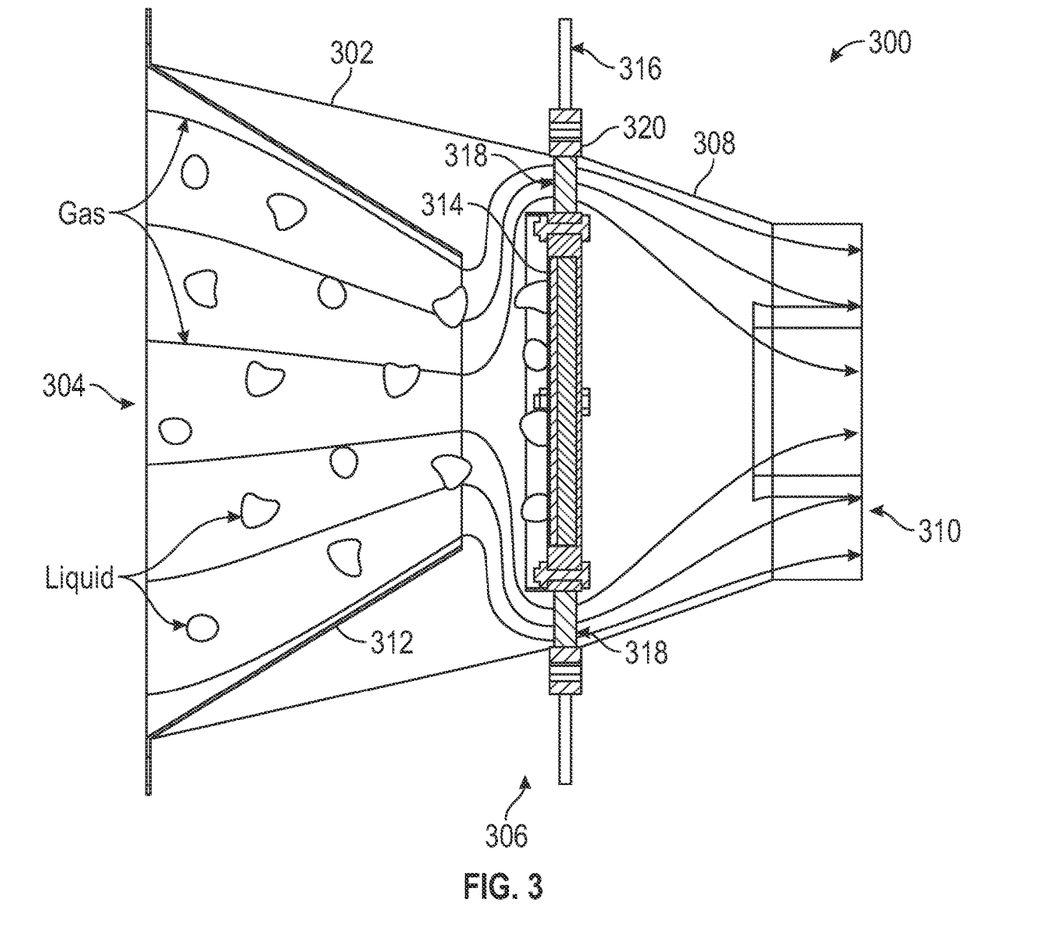
FIG. 3 is a schematic illustration of a two-phase flow through a portion of a phase separator system.

Referring now to FIG. 3, a cross-sectional view of a portion of a phase separator system 300 that may incorporate embodiments of the present disclosure is shown. As shown, a two-phase flow of gas and liquid (e.g., air and water) is directed into a transition duct 302 at an inlet 304, directed toward a separator 306 where gas and liquid are separated, with the gas being directed along and through an outlet conduit 308 to an outlet 310, which may be fluidly connected to a cabin or other space/volume for suppling dry (or reduced moisture content) air to the cabin. The inlet 304 of the transition duct 302 may be coupled to a condenser or condensing heat exchanger, as shown and described above. The condenser is configured to cause the formation of the liquid droplets to form in the flow of fluid into and through the transition duct 302. That is, a two-phase fluid having both gas and liquid components is directed through the transition duct 302. In this configuration, the transition duct 302 includes a guide structure 312 for guiding and directing the two-phase fluid such that the two-phase fluid will interact with the separator 306 for separation of the phases.

Between the inlet duct 302 and the outlet duct 308, the liquid portion of the two-phase flow will interact with a liquid permeable membrane 314 of the separator 306. The liquid permeable membrane 314 is configured to capture the liquid content of the two-phase fluid and prevent some, most, or all of the liquid content from flowing into the outlet conduit 308. The captured liquid phase portion of the flow, that is captured in the liquid permeable membrane 314, will be extracted from the phase separator system 300 and removed through a liquid recovery loop 316, which captures the liquid and directs it to other locations (e.g., storage tank, systems that consume the liquid, dumped overboard, etc.). The gas, which cannot pass through the liquid permeable membrane 314 is directed around the liquid permeable membrane 314 and through one or more openings 318 of a membrane frame 320, such as described above. This gas then flows through the outlet conduit 308 and is directed to the outlet 310.

The annular flow path of the gas around the liquid permeable membrane 314 results in a minimal pressure drop. This allows the phase separator system 300 to be passive, relying on a momentum of the flow of gas from an upstream location (e.g., due to a fan or blower) to pull (or push) both phases through the phase separator system 300. The annular gas flow arrangement and resultant relatively low pressure drop allows passive operation of the phase separator system 300 regardless of the orientation of the phase separator system 300 (e.g., up and down rather than side to side) and regardless of the environment (e.g., low gravity, microgravity, etc.).

To improve phase separation (i.e., liquid capture), embodiments of the present disclosure may provide additional functionality to assist in liquid separation, capture, and removal, and to minimize liquid percentage in the gaseous flow that is directed back to the cabin or other location. For example, in accordance with some embodiments of the present disclosure, one or more structural features may be arranged within the inlet conduit to provide surface area for liquid to condense upon and/or direct a flow of liquid. In other embodiments, and/or in combination therewith, a dispersion member may be used to assist in generation of uniform liquid droplet sizes.

For example, in some embodiments, a condensate director may be provided within the inlet conduit (e.g., transition duct 302) and particularly within a guide structure thereof (e.g., guide structure 312). In some such embodiment, the condensate director may be a finger-like structure or structures arranged downstream from the condenser heat exchanger. In other configurations, the condensate director may take the form of fins, plates, chains, ropes, or other structures that are configured to control a size and distribution of liquid that is condensed out of the flow entering the inlet conduit. The condensate director may be a structure that is configured to control liquid (e.g., condensate) behavior. The condensate director may provide a surface (or surfaces) for the liquid to travel along and direct the liquid towards the separator for collection and capture (e.g., separation from the gaseous portion of a two-phase flow). The condensate director may be configured to control a distance along which droplets of liquid will travel to the separator as well as the position of the droplets in the flow field (e.g., exiting the guide structure 312). The guide structure 312 may also be configured to control liquid droplet size and reduce the air path free volume, thus increasing velocity of the two-phase flow as it interacts with the separator. The condensate director may include other features such as various finger geometry, placement, orientation, coatings, and surface treatments, which may be selected to control liquid flow and capture.

Further, in some embodiments of the present disclosure, a condensate dispersion element may be provided to control a size and/or distribution of liquid droplets. For example, and without limitation, a screen feature may be added upstream from the separator and configured to control a size and distribution of liquid droplets that are condensed out of the two-phase flow. A screen mesh may breakup or separate larger slugs or droplets of condensate that are received from an upstream condenser (e.g., condensing heat exchanger) into predictable size droplets which may improve phase control. The condensate dispersion element may be configured to control liquid droplet behavior by setting flow path geometry, leveraging surface tension and drag forces, and determining a distribution of droplets in the two-phase flow stream. The condensate dispersion element may include various features such as, and without limitation, various mesh geometry (e.g., flat, formed cone, corrugated, etc.), number of layers, mesh style, hole sizing, hole spacing, mesh placement (e.g., multiple, repeating, etc.), coatings, and surface treatments. In some embodiments, a condensate director and a condensate dispersion element.

Figure 4A:
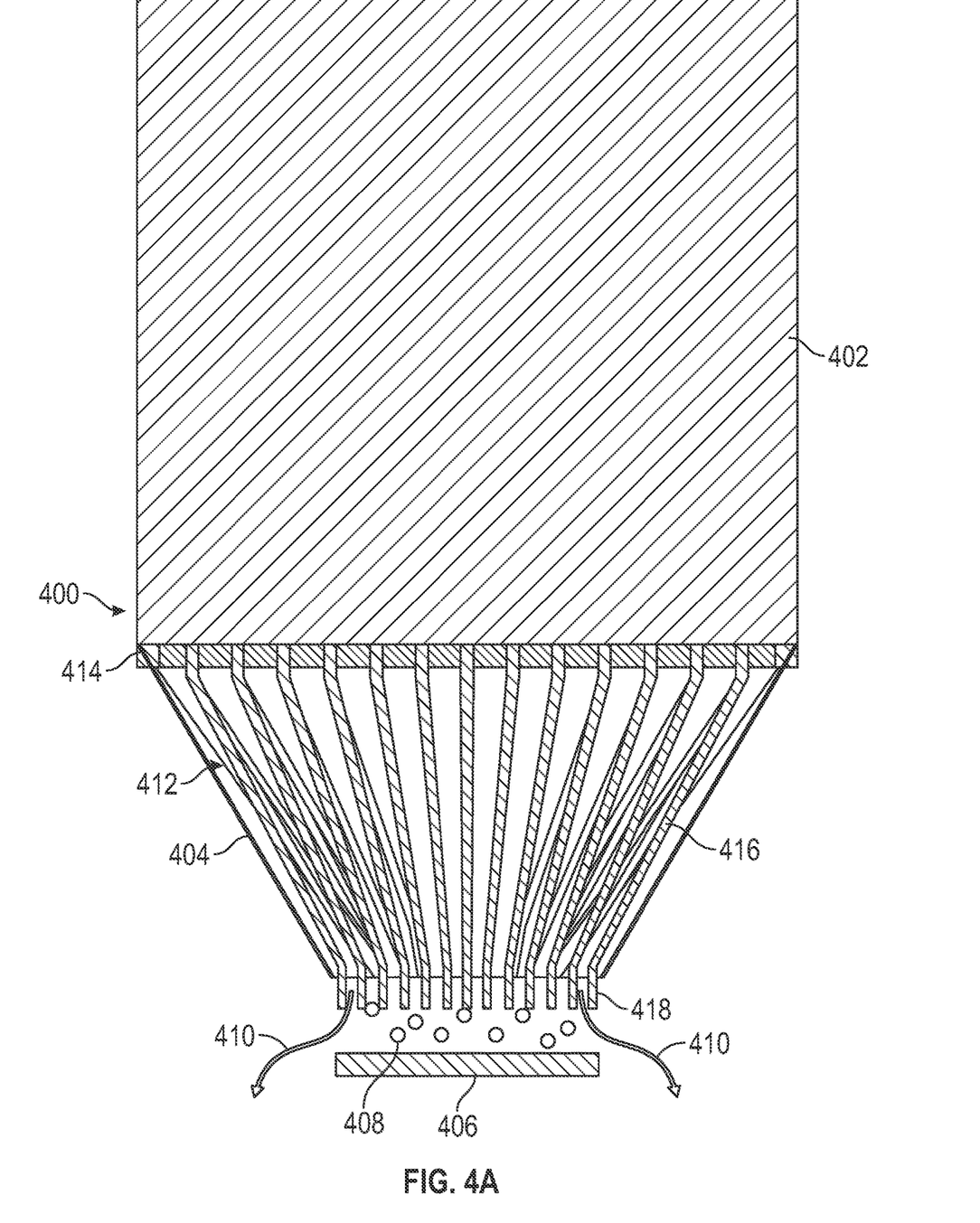
FIG. 4A is a schematic illustration of a portion of a phase separator system in accordance with an embodiment of the present disclosure.
Figure 4B:
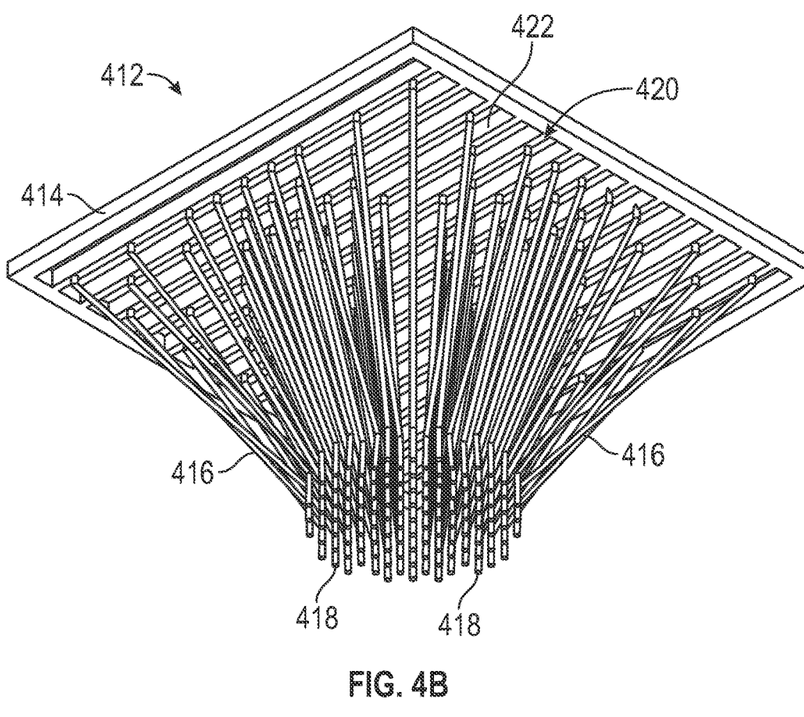
FIG. 4B is a schematic illustration of a condensate director of the phase separator system of FIG. 4A.
Figure 4C:
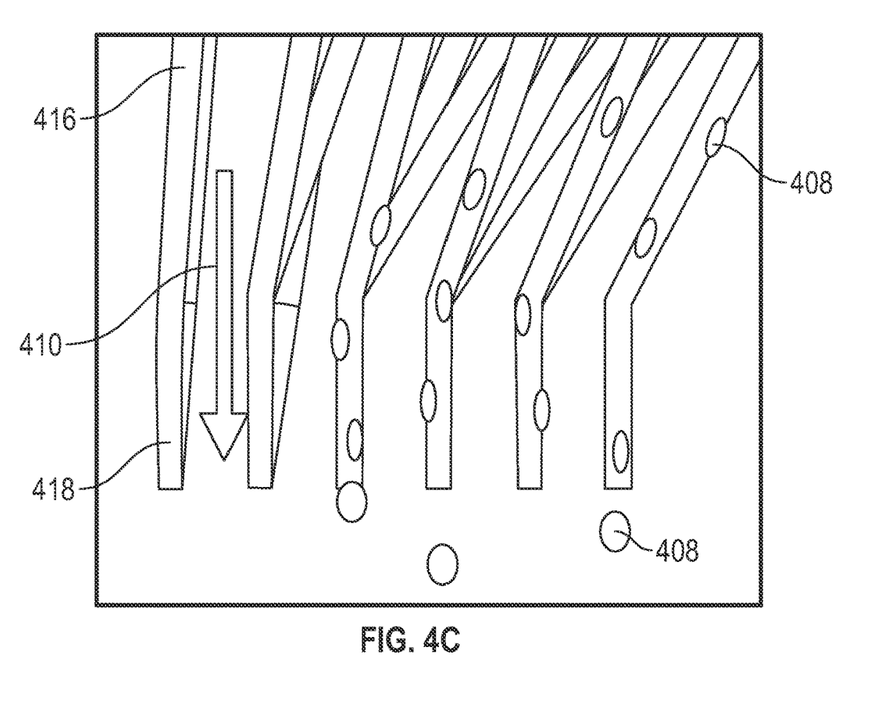
FIG. 4C is an enlarged detailed illustration of a portion of the condensate director of FIG. 4A.

Referring now to FIGS. 4A-4C, schematic illustrations of a portion of a phase separator system 400 in accordance with an embodiment of the present disclosure are shown. The phase separator system 400 includes a condenser 402 arranged fluidly upstream from a transition duct 404 that is arranged upstream from a separator 406, similar to the configurations described above. The condenser 402 is configured to receive warm, moist or humid air from a cabin or other space and cool such air causing liquid droplets to condense within the flow of air, thus forming a two-phase fluid within the condenser 402. The two-phase fluid then exits the condenser 402 and is passed along the transition duct 404 such that the two phases of fluid will be directed at the separator 406 which is arranged to collect the liquid portion 408 of the fluid (e.g., water droplets) and the gaseous portion 410 will flow around and bypass the separator 406. The reduced moisture content gaseous portion 410 may then be recycled back into the cabin or other space from which the humid air was sourced.

Because the phase separator system 400 may be used in a low- or microgravity environment, use of only a blower of the like (e.g., upstream from the condenser 402) may be insufficient to ensure desired levels of separation of the liquid portion 408 from the gaseous portion 410. To aid in the collection, directing, and separation of the liquid portion 408, the phase separator system 400 includes a condensate director 412. The condensate director 412 may be attached to an outlet end or side of the condenser 402 or may be otherwise arranged downstream from the condenser 402. The condensate director 412 is configured to aid in the capture and directing of the liquid portion 408 of the two-phase fluid to be captured by the separator 406, without interfering with permitting the bypass of the gaseous portion 410.

The condensate director 412 is arranged within the transition duct 404. As shown, the condensate director 412 includes a base 414 and a plurality of collector elements 416 extending from the base 414. When installed in the transition duct 404, as shown in FIG. 4A, the base 414 is arranged at the upstream end of the transition duct 404 and distal ends 418 of the collector elements 416 extend to, and in some embodiments from, a downstream end of the transition duct 404. The base 414 of the condensate director 412 includes a plurality of openings 420 and a number of support elements 422. In this illustrative configuration, the support elements 422 are a set of parallel extending ribs or beams that extend across the base 414. As a result, the openings 420 may be substantially parallel, elongated openings. The openings 420 are configured to permit the two-phase fluid to enter the transition duct 404 from the condenser 402. It will be appreciated that the specific configuration of the openings 420 may be selected or set to match geometries of the upstream heat exchanger or for other purposes. In other configurations, the openings 420 and support elements 422 may take other shapes or configurations, depending on the specific configuration. For example, the support elements 422 may take the form of rods, a mesh, a screen, cantilevered arms or rods, or the like.

As the two-phase fluid passes into the transition duct 404 and the condensate director 412, it will pass through the openings 420 and the cooled, liquid portion of the two-phase fluid will contact the surfaces of the base 414, support elements 422, and the collector elements 416. The droplets of liquid may condense or collect on the collector elements 416 and be directed along the length of the collector elements 416 toward the distal ends 418 which are arranged proximate or in contact with the separator 406. Although FIG. 4A illustrates a space or gap between the distal ends 418 of the collector elements 416 and the separator 406, in other configurations, the distal ends 418 of the collector elements 416 may be arranged to end into contact with the separator 406. If a gap or space is present between the distal ends 418 of the collector elements 416 and the separator 408, the droplets of liquid may be pulled or pushed off the collector elements 416 and collected by the separator 408 due to motive force applied by a fan or blower in combination with the narrowing cross-sectional area of the transition duct 404. The narrowing cross-sectional area of the transition duct 404 may serve to increase a flow rate of the two-phase fluid passing from the condenser 402, through the transition duct 404, and into interaction with the separator 406 (e.g., liquid portion 408 collected at the separator 406 and gaseous portion 410 flowing around or bypassing the separator 406).

The material of the condensate director 412 may be selected to encourage capture of the liquid portion 408 while permitting the gaseous portion 410 to flow substantially unimpeded through the transition duct 404. In some embodiments, the components of the condensate director 412 may be coated with a hydrophilic surface coating to prevent the liquid portion 408 from sticking and collecting, but rather flows along the length of the collector elements 416. The collector elements 416 may be solid or hollow tubes, fingers, wires, rods, or the like. In some embodiments, the collector elements 416 may be chains, fins, blades, links, roping, flexible members or the like. The surface material or texture of the collector elements 416 may be provided to encourage droplet collection and capture while also minimizing interference of liquid flow along the collector elements and minimizing interference of gaseous flow between the collector elements.

Although shown in FIG. 4A with the base 414 of the condensate director 412 connected at an inlet end of the transition duct 404, such position is not to be limiting. For example, in other embodiments, the base 414 may be attached or installed into the transition duct 404 at a point between the inlet end and the outlet end. In still further embodiments, the condensate director 412 may be installed at the outlet end of the transition duct 404, and extend from an end thereof and upstream of the separator 406. In still further embodiments, the condensate director 412 may be arranged upstream from the transition duct 404 and downstream from the condenser 402. As such, the specific location of the condensate director is not intended to be limiting. The length of the collector elements may be selected based, in part, on the location of the base of the condensate director relative to the separator. In some embodiments, and without limitation, the length of the collector elements may be equal to or greater than a length, in a flow direction, of the transition duct. In other embodiments, the collector elements may have a length, in a flow direction, that is shorter than a length of the transition duct.

In FIG. 4B, the base 414 is illustratively shown having the set of parallel extending support elements 422, which define parallel extending openings 420. Such a configuration is not to be limiting. For example, other geometries of the base and/or the support elements may be provided without departing from the scope of the present disclosure. For example, in some embodiments, the support elements may be arranged in a grid pattern, with the intersections of intersecting support elements defining locations from which the collector elements may extend. Further, it should be noted that although a substantially square shape is shown in FIG. 4B, a square base 414 is not intended to be limiting.

Rather, the base may take any geometry shape, and may particularly be shaped to match a geometry of an outlet of the condenser, a shape of the transition duct, an outlet of the transition duct, and/or a shape of the separator 406.

As shown in FIGS. 4A, 4C, proximate the distal ends 418 of the collector elements 416, droplets of the liquid portion 408 may be collected on and dispensed from the distal ends 418 toward the separator 406. Further, as shown, the gaseous portion 410 of the two-phase fluid may pass unobstructed between the collector elements 416 and then may pass around the separator 406.

In accordance with the configuration shown in FIGS. 4A-4C, and variations thereof, the condensate director 412 is to the phase separator system 400 to assist in controlling the behavior of the liquid portion of the two-phase flow that has been condensed out of the humid air. The condensate director 412 is configured to control the behavior of the liquid portion (e.g., condensate). For example, the condensate director 412 provides a surface for the liquid to travel along (e.g., due to water surface tension) and direct such liquid toward the separator 406. Further, the condensate director 412 can control droplet position when the droplets move into air stream (e.g., between the transition duct 404 and the separator 406). The condensate director 412 may be configured to reduce a distance between the droplet's movement into the free stream and the separator 406. Further, in some embodiments, the condensate director 412 may control a position in the flow stream at which the liquid portion is separated from the condenser 402 (e.g., immediately at an outlet, or at some location downstream therefrom). Furthermore, the condensate director 412 may provide some control of the size of liquid droplets when the droplets move into the air stream toward the separator 406 (e.g., controlled by droplet capture and formation along the length of the condensate director 412). Additionally, the inclusion of the condensate director 412 may increase a flow speed of the two-phase flow by decreasing flow area through the transition duct 404. That is, the condensate director 412 (e.g., at the base 414 and within the transition duct 404) will occupy space and thus reduce the flow area, which in turn may increase the flow speed through the transition duct.

Accordingly, advantageously, the condensate director 412 may increase control of liquid droplet behavior, which may result in increased liquid droplet capture and increased phase separator effectiveness/liquid recovery efficiency. Such improvements may increase human and hardware safety (e.g., prevention of liquid droplets from returning to the cabin/source location). Further, when used in space or other non-easy to access locations, the condensate director 412 can reduce life costs through loop closure and improved liquid extraction from a cycled flow.

In accordance with embodiments of the present disclosure, features of the condensate director may be configured to specific applications. For example, the base and collector elements may be formed of the same material, or in other embodiments, the two structures may be formed from different materials. Further, in some embodiments, different collector elements may be formed from different materials. Materials for the base and/or collector elements may be selected from, without limitation and for example only, stainless steel, stainless steel alloys, aluminum alloys, nickel alloys, titanium alloys, non-metallic materials, such as polymers (e.g., polyethylene, polypropylene, nylon, etc.), and the like. Further, such materials may be coated with materials to aid in the capture and directing of the liquid droplets. As such, in some embodiments, a hydrophilic coating may be applied to the base and/or collector elements. Such coatings may be hydrophilic polymer coatings and in some configurations may include a biocide treatment.

Furthermore, the number, length, arrangement and configuration of the collector elements may be selected based on operational requirements and/or other considerations. In some embodiments, the collector elements may be configured based on the upstream heat exchanger (e.g., size of the heat exchanger), flow rates through the system, and the like. In some embodiments, the collector elements may extend downstream from an outlet of the transition duct (e.g., as shown in FIG. 4A). In other embodiments, the distal ends of the collector elements may terminate before the outlet of the transition duct. The density (e.g., number, size, volume occupied) of the collector elements may be varied or selected based on flow rates and the size of the transition duct in which the collector elements are located. For example, the collector elements may occupy a little as 10% of the total volume or cross-sectional area of the transition duct or as high as 80% of the total volume or cross-sectional area. Further, when employing collector elements of non-uniform size/shape/dimension (e.g., tapering), the occupied volume or cross-sectional area may be varied in the flow direction through the transition duct.

Figure 5A:
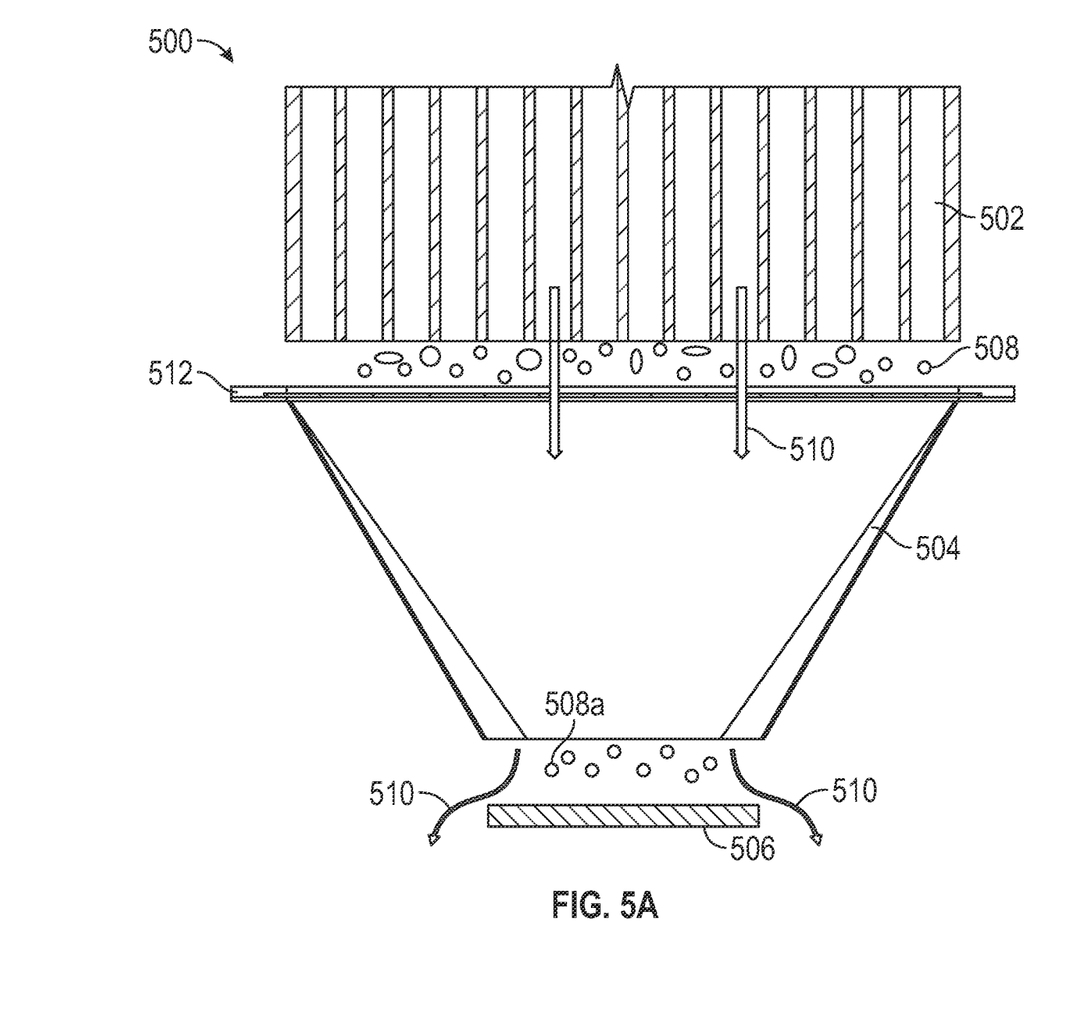
FIG. 5A is a schematic illustration of a portion of a phase separator system in accordance with an embodiment of the present disclosure.
Figure 5B:
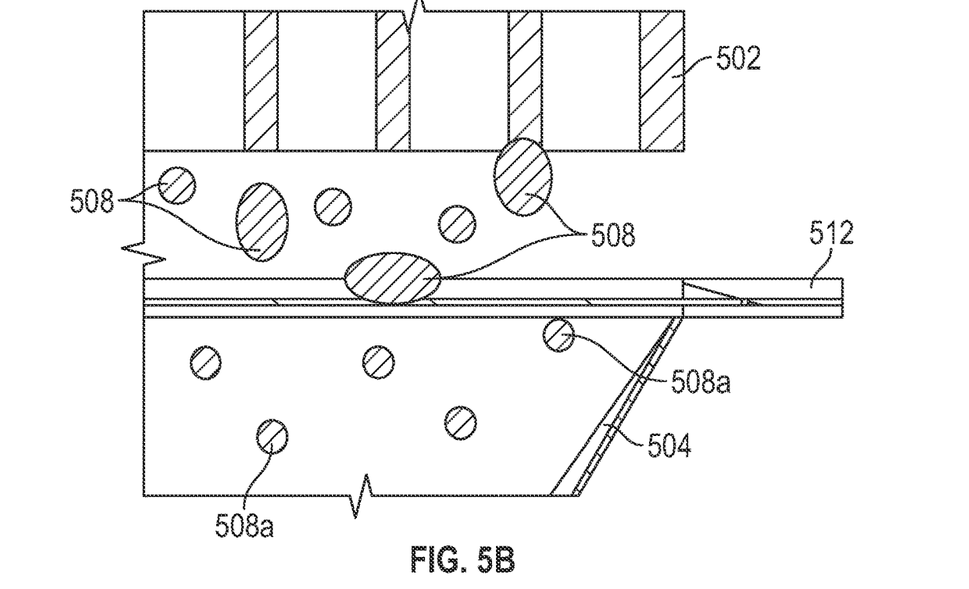
FIG. 5B is an enlarged illustration of a portion of the phase separator system shown in FIG. 5A.
Figure 5C:
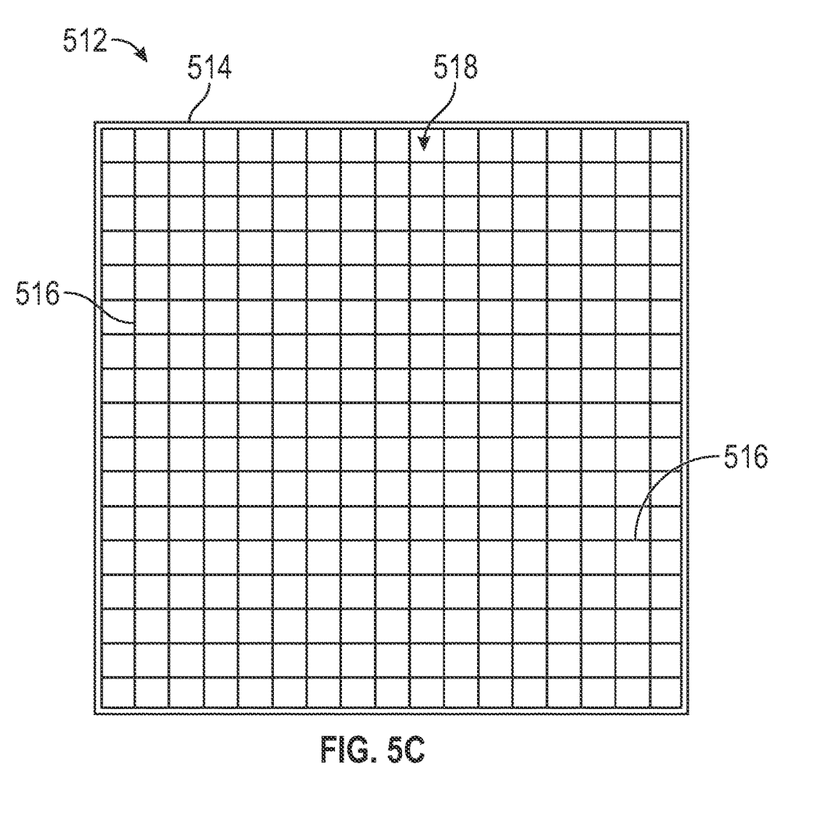
FIG. 5C is a plan view of a condensate dispersion element of the phase separator system of FIG. 5A.

Referring now to FIGS. 5A-5C, schematic illustrations of a portion of a phase separator system 500 in accordance with an embodiment of the present disclosure are shown. The phase separator system 500 includes a condenser 502 arranged fluidly upstream from a transition duct 504 that is arranged upstream from a separator 506, similar to the configurations described above. The condenser 502 is configured to receive warm, moist or humid air from a cabin or other space and cool such air causing liquid droplets to condense within the flow of air, thus forming a two-phase fluid within the condenser 502. The two-phase fluid then exits the condenser 502 and is passed along the transition duct 504 such that the two phases of fluid will be directed at the separator 506 which is arranged to collect the liquid portion 508 of the fluid (e.g., water droplets) and the gaseous portion 510 will flow around and bypass the separator 506. The reduced moisture content gaseous portion 510 may then be recycled back into the cabin or other space from which the humid air was sourced.

Because the phase separator system 500 may be used in a low- or microgravity environment, use of only a blower of the like (e.g., upstream from the condenser 502) may be insufficient to ensure desired levels of separation of the liquid portion 508 from the gaseous portion 510. To aid in the collection, directing, and separation of the liquid portion 508, the phase separator system 500 includes a condensate dispersion element 512. The condensate dispersion element 512 may be attached to an outlet end or side of the condenser 502 or may be otherwise arranged downstream from the condenser 502, such as at an inlet end of the transition duct 504. The condensate dispersion element 512 is configured to aid in the capture and directing of the liquid portion 508 of the two-phase fluid to be captured by the separator 506, without interfering with permitting the bypass of the gaseous portion 510.

In this configuration, the condensate dispersion element 512 may be configured as a gridded or mesh structure that comprises a set of wires, screen mesh, or the like. As the liquid portion 508 of the two-phase fluid exits the condenser 502, the droplets of the liquid portion 508 may be of differing sizes and may be randomly distributed within the two-phase flow. The condensate dispersion element 512 is configured to assist in controlling size and distribution of the liquid portion (e.g., droplets of water) that has been condensed out of the air flow within the condenser 502. The condensate dispersion element 512 is configured to break up relatively large slugs of condensate traveling out of the condenser 502 into predictable size droplets. That is, the condensate dispersion element 512 is configured to break up droplets of the liquid portion to be no larger than a predetermined droplet size. For example, and without limitation, the condensate dispersion element 512 may be configured to reduce or break apart droplet having sizes of greater than 0.1 cm. Such predictable size droplets can improve droplet controllability (e.g., velocity, flow distribution, etc.) as the two-phase fluid is directed into interaction with the separator 506. As such, the separator 506 may more efficiently remove the liquid portion. Although a specific maximum droplet size is noted above, it will be appreciated that the maximum droplet size may be determined by the specific application and/or configured of the condensate dispersion element, and thus the example maximum droplet size is for example purposes only and is not intended to be limiting. For example, a system having relatively high flow velocities may be able to tolerate larger droplet sizes than a similar system having a relatively lower flow velocity.

As shown in the detail image of FIG. 5B, the liquid portion 508 may exit the condenser 502 having different sizes and shapes of droplets. However, as the liquid portion 508 passes through the condensate dispersion element 512, the droplet size may be converted into a more uniform pattern of droplet sizes, referred to as uniform liquid portion 508a. The uniform liquid portion 508a may then pass through the transition duct 504 to be directed into contact or interaction with the separator 506, for collection of the liquid portion 508 (as uniform droplets in uniform liquid portion 508a). As shown, the condensate dispersion element 512 is arranged at an inlet end of the transition duct 504. However, in other embodiments, the position of the condensate dispersion element may be arranged at other locations between the condenser 502 and the separator 506. For example, in some embodiments, the condensate dispersion element may be arranged at an outlet end of the transition duct 504. In other embodiments, the condensate dispersion element may be arranged at some point between the inlet end and the outlet end of the transition duct 504. Further, in some embodiments, multiple different condensate dispersion elements may be arranged in series along a flow direction between an outlet of the condenser 502 and the separator 506 (within or separate from the transition duct 504. In some such embodiments, a grid size of the condensate dispersion elements may progressively shrink to achieve a desired droplet size for the uniform liquid portion 508a.

As shown in FIG. 5C, the condensate dispersion element 512 has a grid-like pattern. The condensate dispersion element 512 comprises a frame 514 and a dispersion structure 516 (e.g., mesh, wires, rods, ribs, etc.) that are arranged within the frame 514 and define openings 518. The openings 518 are provided to permit the gaseous portion and relatively small droplets to pass through the condensate dispersion element 512 without substantial interference. However, droplets having a size larger than a size of the openings 518 (or when not aligned with an opening 518) will contact the dispersion structure 516 and the droplets will be divided into smaller droplets (e.g., as schematically shown in FIG. 5B, transitioning from liquid portion 508 to uniform liquid portion 508a).

In accordance with the embodiment of FIGS. 5A-5C, the condensate dispersion element 512 is provided that can be added to phase separator systems to assist in controlling size and distribution of the liquid that has been condensed out of a humid air flow and converted to a two-phase flow within the condenser 502. The screen mesh or other structure of the condensate dispersion element 512 is configured to break up larger slugs of condensate traveling out of the condenser 502 into predictable size droplets which improves droplet controllability. The condensate dispersion element 512 may include multiple or repeating screen features (e.g., of the same or different screen sizes). In some embodiments, screens or mesh of the same size may be used with offset holes to ensure that larger droplets will contact at least one screen or mesh. In some embodiments, a series of condensate dispersion elements may be provided with crossing elements that are angled relative to each other. For example, a first condensate dispersion element may have a set of dispersion structures angled in a first direction and a second condensate dispersion element may have a set of dispersion structures angled offset from the first direction resulting in a three-dimensional grid structure.

In other embodiments, or in combination therewith, different screen or mesh sizes may be used to achieve a desired droplet size (e.g., a series of reducing size openings within the condensate dispersion elements in a flow direction). Further, the condensate dispersion element 512 can control the distribution of condensate droplets throughout the cross-sectional area of the flow stream at the outlet of the transition duct 504. The condensate dispersion element 512 may control condensate (e.g., liquid droplet) behavior by controlling liquid flow path geometry, leveraging surface tension and drag forces, taking advantage of the incompressibility of liquid (e.g., water) relative to air, and the like. Furthermore, in some embodiments, the condensate dispersion elements may have varying thickness in a flow direction. In some embodiments, the condensate dispersion element may be configured with different geometry mesh pattern (e.g., non-grid) and may take any geometrical arrangement. These features, and others thereof, in turn may provide for improved liquid capture from a two-phase flow.

In accordance with some embodiments, the condensate dispersion element may encompass all or any portion of the flow field cross section. Further, multiple condensate dispersion elements may be placed in similar portions of the flow field cross sections or may each address unique portions of the flow field cross section. It will be appreciated that multiple distinct condensate dispersion elements may be arranged within a single plane (e.g., adjacent to each other) and/or may be staggered in a flow direction.

In accordance with embodiments of the present disclosure, features of the condensate dispersion element may be configured to specific applications. For example, the condensate dispersion element may be formed of a single material, or in other embodiments, multiple different materials may be employed to form the condensate dispersion element. In some embodiments, such as those employing multiple condensate dispersion elements, the different condensate dispersion elements may be formed from different materials. Materials for the condensate dispersion elements may be selected from, without limitation and for example only, stainless steel, stainless steel alloys, aluminum alloys, nickel alloys, titanium alloys, non-metallic materials, such as polymers (e.g., polyethylene, polypropylene, nylon, etc.), and the like. Further, such materials may be coated with materials to aid in the separation of large droplets and preventing liquid droplets from accumulating on the condensate dispersion elements. For example, in some embodiments, a hydrophilic coating may be applied to the condensate dispersion element(s). Such coatings may be hydrophilic polymer coatings and in some configurations may include a biocide treatment.

Mesh sizes for the condensate dispersion elements may be varied and selected to achieve a desired maximum droplet size. For example, the mesh sizes may range from 40×40 to 400×400 (mesh count per inch). As one non-limiting example, the mesh size may be 150×150 mesh count per inch. In some configurations, the mesh configuration of the condensate dispersion elements may be based on the open area of the condensate dispersion element. For example, the mesh material may fill between 20% and 80% of the cross-sectional area of the condensate dispersion elements, and thus 80% to 20% may be open, through-flow area, respectively.

Figure 6:
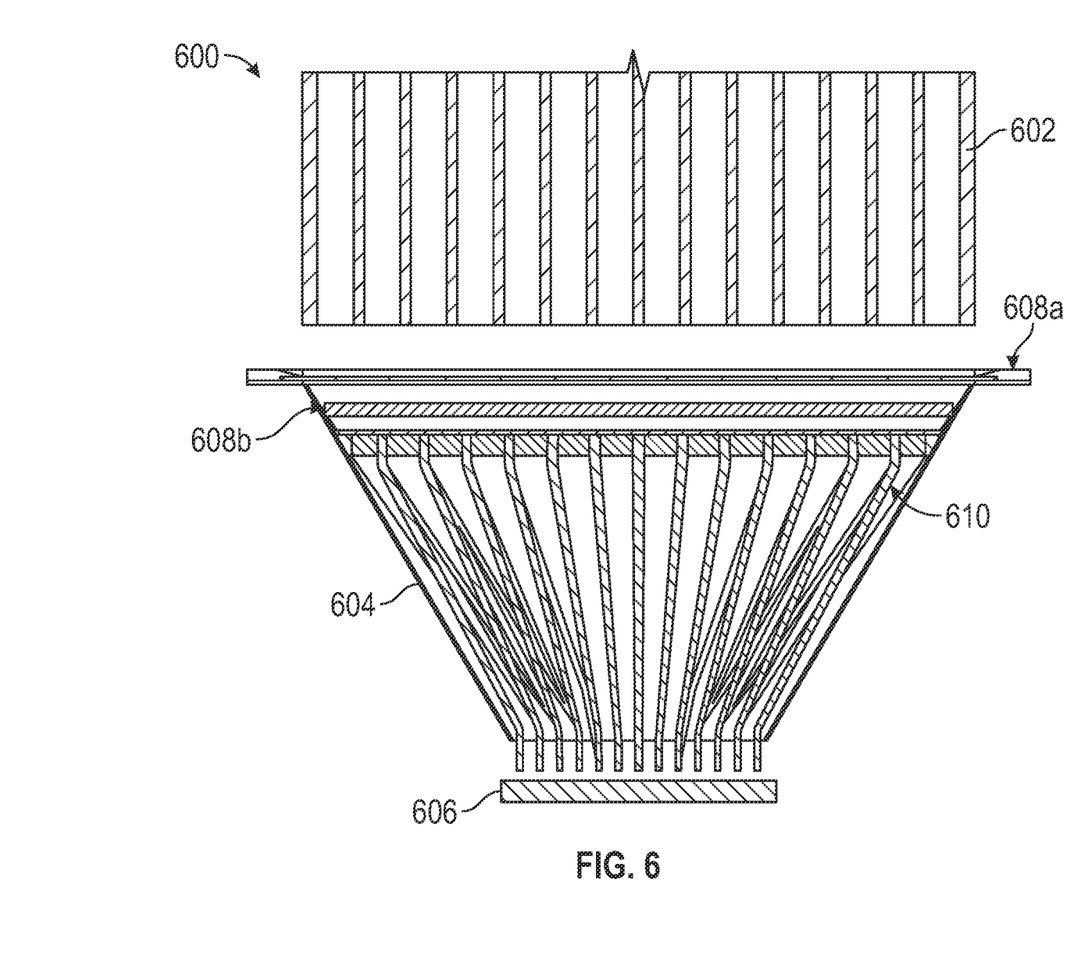
FIG. 6 is a schematic illustration of a portion of a phase separator system in accordance with an embodiment of the present disclosure.

Referring now to FIG. 6, a schematic illustration of a portion of a phase separator system 600 in accordance with an embodiment of the present disclosure is shown. The phase separator system 600 includes a condenser 602 arranged fluidly upstream from a transition duct 604 that is arranged upstream from a separator 606, similar to the configurations described above. In this configuration, a combination of condensate dispersion elements 608a, 608b and a condensate director 610. The condensate dispersion elements 608a, 608b may be configured similar to that shown and described above with respect to FIGS. 5A-5C and the condensate director 610 may be configured similar to that shown and described above with respect to FIGS. 4A-4C. In this configuration, a first or upstream condensate dispersion element 608a may have openings (e.g., openings 518 shown in FIG. 5C) that have a first opening size and a second or downstream condensate dispersion element 608b may have openings that are smaller than the openings of the first condensate dispersion element 608a. It will be appreciated that such a configuration may be used with or without the condensate director 610.

In this configuration, the condensate dispersion elements 608a, 608b may provide droplet size control for the liquid portion, and the condensate director 610 may then capture and direct such droplets along the lengths thereof. That is, the combination of the two components described herein may be combined. Although shown in FIG. 6 with two condensate dispersion elements 608a, 608b, in other configurations a single condensate dispersion element or more than two condensate dispersion elements may be provided, either upstream and/or downstream from the condensate director 610. Further, if appropriate for a given application, multiple condensate directors may be incorporated into a system to achieve a desired control of the liquid portion of a two-phase flow to improve the efficiency of liquid capture.

Advantageously, embodiments of the present disclosure are directed to attachments or structural elements to be included with a phase separator system to improve liquid separation and removal from an airflow through the phase separator system. The phase separator system may be part of an environmental control and/or thermal control system for use on a craft (e.g., spacecraft, aircraft, etc.). In accordance with some embodiments, improvements in liquid removal may be achieved even within low or microgravity environments. That is, even without the assistance of gravity, the phase separator systems described herein may efficiently remove liquid from a two-phase fluid (e.g., water from moist air). The dried or less humid air may be recycled back to the original source location (e.g., cabin, occupancy space, etc.) while the captured water may be used for other purposes.

Advantageously, condensate dispersion elements and/ condensate directors may be incorporated into the flow path of a humid airflow to aid in separation and removal of liquid (e.g., water) content from the humid airflow. By including one or more condensate dispersion elements, the droplet size of liquid that is passed from a condenser may be controlled such that a maximum droplet size is not exceeded. By controlling the droplet size, the amount of motive air may be controlled. Further, the use of a separator in combination with such condensate dispersion elements may allow for optimized or maximized liquid capture and removal. Separately, or in combination, one or more condensate directors may be used to provides surfaces upon which droplets may condense and then travel along such that distal ends of the condensate directors may direct liquid droplets onto or into contact with a separator that is used to collect liquid from a flow. As such, improved liquid (e.g., water) removal may be achieved and thus recycled air may be dried sufficiently (i.e., liquid removed), even in low or microgravity environments.

The terms "about" and "substantially" are intended to include the degree of error associated with measurement of the particular quantity based upon the equipment available at the time of filing the application. For example, "about" can include a range of ±8% or 5%, or 2% of a given value. Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A phase separator system comprising:
    a condenser configured to receive humid air from a source space, the condenser configured to convert the humid air into a two-phase fluid having a gaseous portion and a liquid portion;
    a transition duct arranged downstream from the condenser in a flow direction through the phase separator system and configured to direct the two-phase fluid through a narrowing path defined by the transition duct;

a separator arranged downstream from the transition duct, the separator configured to interact with the two-phase fluid that exits the transition duct and capture the liquid portion and permit the gaseous portion to bypass the separator and flow downstream therefrom as a reduced moisture content airflow; and a condensate dispersion element arranged between the condenser and the separator, the condensate dispersion element comprising a dispersion structure arranged to break up liquid droplets of the liquid portion of the two-phase fluid and direct said liquid droplets to the separator, wherein the condensate dispersion element comprises a frame and the dispersion structure comprises a mesh material.

2. The phase separator system of claim 1, wherein the mesh material has a mesh size of between 40×40 mesh count per inch and 400×400 mesh count per inch.

3. The phase separator system of claim 1, wherein the mesh material has a mesh size of 150×150 mesh count per inch.

4. The phase separator system of claim 1, wherein the condensate dispersion element is attached to an outlet end of the condenser.

5. The phase separator system of claim 1, wherein the condensate dispersion element is attached to an upstream end of the transition duct.

6. The phase separator system of claim 1, wherein the condensate dispersion element is attached to a downstream end of the transition duct.

7. The phase separator system of claim 1, wherein the condensate dispersion element is arranged within the transition duct between an inlet end and an outlet end thereof.

8. The phase separator system of claim 1, wherein the condensate dispersion element occupies at least 20% of a cross-sectional area of the transition duct.

9. The phase separator system of claim 1, wherein the condensate dispersion element is a first condensate dispersion element arranged within the transition duct, the system further comprising a second condensate dispersion element arranged downstream from the first condensate dispersion element within the transition duct.

10. The phase separator system of claim 9, wherein the second condensate dispersion element comprises openings that are smaller than openings of the first condensate dispersion element.

11. The phase separator system of claim 1, wherein the condensate dispersion element comprises a hydrophilic surface coating.

12. The phase separator system of claim 1, wherein the condensate dispersion element is made of stainless steel, a stainless steel alloy, an aluminum alloy, a nickel alloy, a titanium alloy, a polymer, or a combination thereof.

13. The phase separator system of claim 1, further comprising a condensate director arranged between the condenser and the separator, the condensate director configured to receive liquid droplets and direct said liquid droplets along the length of collector elements to the separator.

14. The phase separator system of claim 13, wherein the condensate dispersion element is arranged upstream in a flow direction from the condensate director.

15. The phase separator system of claim 1, further comprising a blower arranged to provide motive force to the humid air to pass through the condenser, the transition duct, and the separator.

16. The phase separator system of claim 1, wherein the source space is a human occupancy cabin.

17. The phase separator system of claim 16, wherein the cabin is a cabin of a spacecraft.

18. The phase separator system of claim 16, wherein the cabin, the condenser, the transition duct, and the separator define a closed-loop system that is configured to remove liquid content of the two-phase fluid before returning reduced moisture content air back to the cabin.

19. The phase separator system of claim 18, further comprising a thermal control valve and a bypass configured to direct a portion of the humid air around the condenser, the transition duct, and the separator to be mixed with the reduced moisture content air prior to returning to the cabin.

20. A phase separator system comprising:
a condenser configured to receive humid air from a source space, the condenser configured to convert the humid air into a two-phase fluid having a gaseous portion and a liquid portion;

a transition duct arranged downstream from the condenser in a flow direction through the phase separator system and configured to direct the two-phase fluid through a narrowing path defined by the transition duct;

a separator arranged downstream from the transition duct, the separator configured to interact with the two-phase fluid that exits the transition duct and capture the liquid portion and permit the gaseous portion to bypass the separator and flow downstream therefrom as a reduced moisture content airflow; and a condensate dispersion element arranged between the condenser and the separator, the condensate dispersion element comprising a dispersion structure arranged to break up liquid droplets of the liquid portion of the two-phase fluid and direct said liquid droplets to the separator, wherein the condensate dispersion element is one of:
attached to an outlet end of the condenser;
attached to an upstream end of the transition duct; or
arranged within the transition duct between an inlet end and an outlet end thereof.

* * * * *